(12) United States Patent
Hegazy et al.

(10) Patent No.: US 9,262,721 B2
(45) Date of Patent: Feb. 16, 2016

(54) AUTOMATICALLY SELECTING ANALOGOUS MEMBERS FOR NEW POPULATION MEMBERS BASED ON INCOMPLETE DESCRIPTIONS, INCLUDING AN UNCERTAINTY CHARACTERZING SELECTION

(71) Applicants: Repsol, S.A., Madrid (ES); International Business Machines Corporation, Armonk, NY (US)

(72) Inventors: Mohamed Ahmed Hegazy, Heliopolis Cairo (EG); Sonia Mariette Embid Droz, Madrid (ES); Elena Margarita Alvarez Escobar, Madrid (ES); Maria Jose Lopez Perez-Valiente, Madrid (ES); Hilario Martin Rodriguez, Mostoles (ES); Ulisses T. Mello, Blauvelt, NY (US); Cicero Nogueira Dos Santos, Rio de Janeiro (BR); Marcos Rodrigues Vieira, Rio de Janeiro (BR); Bianca Zadrozny, Rio de Janeiro (BR)

(73) Assignees: REPSOL, S.A., Madrid (ES); International Business Machines Corporation, Armonk, NY (US)

( * ) Notice: Subject to any disclaimer, the term of this patent is extended or adjusted under 35 U.S.C. 154(b) by 363 days.

(21) Appl. No.: 13/963,818

(22) Filed: Aug. 9, 2013

(65) Prior Publication Data
US 2014/0136466 A1    May 15, 2014

Related U.S. Application Data

(63) Continuation-in-part of application No. 13/677,289, filed on Nov. 14, 2012.

(51) Int. Cl.
*G06N 5/04* (2006.01)
*G06Q 10/04* (2012.01)

(52) U.S. Cl.
CPC ............... *G06N 5/048* (2013.01); *G06Q 10/04* (2013.01)

(58) Field of Classification Search
None
See application file for complete search history.

(56) References Cited

U.S. PATENT DOCUMENTS 6,748,280 B1 *   6/2004   Zou et al. ................. 700/31
2005/0075789 A1 * 4/2005   Xiao et al. ............... 702/6

(Continued)

OTHER PUBLICATIONS

Hashemi, Logical considerations in applying pattern recognition techniques on seismic data: Precise ruling, realistic solutions, 2010.*

(Continued)

*Primary Examiner* — Jeffrey A Gaffin
*Assistant Examiner* — Mikayla Chubb
(74) *Attorney, Agent, or Firm* — Law Office of Charles W. Peterson, Jr.; Louis J. Percello, Esq.

(57) ABSTRACT

A population comparison system, method and a computer program product. A stored list of population members, e.g., hydrocarbon reservoirs, includes parameters for corresponding known characteristics and analogous members for each member. A new population member input receives new member descriptions including parameters for each respective new member. A parameter extraction system automatically extracts an estimated value for each missing key parameter, providing a supplemented description. An analogous member selector automatically selects a subset of listed population members as analogous members for each new population member responsive to the supplemented description. The analogous members serve as a basis for uncertainty characterization from the joint parameter distribution and univariate distributions for each parameter.

24 Claims, 6 Drawing Sheets

(56) References Cited

U.S. PATENT DOCUMENTS

2011/0118983 A1    5/2011   Rowan
2011/0191029 A1*   8/2011   Jalali et al. .................. 702/6
2012/0303410 A1*  11/2012   Connors et al. ............. 705/7.31
2014/0039795 A1*   2/2014   Temizel ....................... 702/11

OTHER PUBLICATIONS

Hashemi, "Logical considerations in applying pattern recognition techniques on seismic data: Precise ruling, realistic solutions," CSEG Recorder, Apr. 2010, pp. 47-49.
ISR mailed Mar. 10, 2014 for the parent to this application, U.S. Appl. No. 13/677,289—PCT/US2013/068986.
Wang "Reservoir Characterization and Horizontal Well Placement Guidance Acquisition by Using GIS and Data Mining Methods", Thesis for University of Calgary, Jun. 2012, http://www.ucalgary.ca/engo_webdocs/XW/12.20355_Baijie%20Wang.pdf.
Holdaway Let Oil and Gas Talk to You: Predicting Production Performance, Apr. 2012. 5 http://support.sas.com 25 A lresources/papers!proceedings121342-2012.pdf.
J.E. Hodgin et al., "The Selection, Application, and Misapplication of Reservoir Analogs for the Estimation of Petroleum Reserves" SPE 102505, 2006.
Vikas Bhushan et al., "A Novel Approach to Identify Reservoir Analogues," SPE 78338, Shell International Exploration and Production, 2002.
Amir Navot et al., "Nearest neighbor based feature selection for regression and its application to neural activity," Advances in Neural Information Processing Systems 18, 2006.
Hamarat et al., "A genetic algorithm based feature weighting methodology" International Conference on Computers and Industrial Engineering, Fac. of Technol., Policy & Manage., Delft Univ. of Technol., Delft, Netherlands, 2010.

* cited by examiner

AUTOMATICALLY SELECTING ANALOGOUS MEMBERS FOR NEW POPULATION MEMBERS BASED ON INCOMPLETE DESCRIPTIONS, INCLUDING AN UNCERTAINTY CHARACTERZING SELECTION

CROSS REFERENCE TO RELATED APPLICATION

The present invention is a continuation in part of U.S. patent application Ser. No. 13/677,289, "SYSTEM, METHOD AND PROGRAM PRODUCT FOR AUTOMATICALLY SUPPLYING MISSING PARAMETERS FOR MATCHING NEW MEMBERS OF A POPULATION WITH ANALOGOUS MEMBERS" to Mohamed Ahmed Hegazy et al., filed Nov. 14, 2012, assigned to the assignee of the present invention and incorporated herein by reference.

BACKGROUND OF THE INVENTION

1. Field of the Invention

The present invention is related to valuating hydrocarbon reservoirs and more particularly to automatically supplying missing parameters for a newly identified reservoir and an uncertainty associated with each supplied parameter, parameters that are necessary for accurately selecting analogous reservoirs and valuating each new hydrocarbon reservoir.

2. Background Description

The total amount of material that is ultimately recoverable from each new hydrocarbon reservoir (production potential) and the cost of recovering that material, or capture difficulty, determine the inherent value of the reservoir. Until the material is actually recovered, however, that inherent value can only be estimated from different reservoir properties. Many of these reservoir properties may be known, and many of them may be unknown. Previously, estimates were based on existing reservoirs that have similar properties limited to those known for the new reservoir. These existing reservoirs with similar properties are known as "analogous reservoirs." Typically, one or more experts identified and selected analogous reservoirs, based solely on experience and the known properties for the new reservoir. When enough is known about a new reservoir, however, what is known as a similarity function may be used to automate, or at least partially automate, selection.

Similarity functions have been used for comparing members of a collection of objects, or population, and selecting those objects that, although they not identical, are recognizably similar. So, in a typical state of the art approach to valuating reservoirs, an expert (or experts) first selected the analogous reservoirs.

Missing or unknown properties make selecting the closest analogous reservoirs guesswork at best, and further, make estimating the value error prone. A mis-valuation could lead to wasted resources, e.g., from passing on an undervalued reservoir to exploiting an overvalued reservoir. Missing parameters increase the likelihood of a mis-valuation.

Thus, there is a need for improved, more complete descriptions of new reservoirs used in valuating the new reservoirs; and, more particularly for supplementing incomplete descriptions of new reservoirs with fact based estimates of missing description parameters and providing an uncertainty associated with the estimates, such that the supplemented descriptions facilitate selecting existing hydrocarbon reservoirs as analogous, and valuating the new reservoirs with a known uncertainty as to the result.

SUMMARY OF THE INVENTION

A feature of the invention is incomplete descriptions of new reservoirs are supplemented with estimates of missing description parameters and any uncertainty associated with the estimates, based on cataloged characteristics of existing reservoirs;

Another feature of the invention is selection of an optimum subset of known reservoirs as analogous reservoirs with a known uncertainty for valuating or appraising each newly discovered reservoir, based on an initially incomplete description of the new reservoir as supplemented with estimates of missing description parameters derived from cataloged characteristics of existing reservoirs.

The present invention relates to a population comparison system, method and a computer program product therefor. A stored list of population members, e.g., hydrocarbon reservoirs, includes parameters for corresponding known characteristics and analogous members for each member. A new population member input receives new member descriptions including parameters for each respective new member. A parameter extraction system automatically extracts an estimated value for each missing key parameter, providing a supplemented description. An analogous member selector automatically selects a subset of listed population members as analogous members for each new population member responsive to the supplemented description.

One embodiment is a population comparison method comprising: storing a list of population members and corresponding member characteristics parameters describing each listed member; receiving a description for a new population member, said description missing one or more member characteristics parameters; automatically estimating a value for at least one missing member characteristic parameters responsive to stored said member characteristics parameters; supplementing said description with each estimated value; automatically comparing the supplemented description against stored descriptions for each listed member; and selecting a subset of listed members as analogous members for said new population member responsive to the comparison.

In this embodiment at least one missing member characteristics parameters is a key parameter (KP). A plurality of said KPs are identified as controlling KPs (CKPs), and one or more said at least one missing member characteristics parameters is a CKP. Automatically estimating estimates values for CKPs, estimated said values supplementing said description, missing said values for said KPs not identified as CKPs remaining unknown. Automatically estimating CKP values determines an uncertainty for each estimated value, and automatically comparing providing a cumulative uncertainty for said each listed member responsive to determined uncertainties for estimated values. Automatically estimating estimates values for remaining unknown KPs responsive to said selected subset.

The method may further comprise pre-processing raw member data, said raw member data including an entry for said each listed member, each said entry including said corresponding member characteristics parameters; eliminating outlier members; transforming, normalizing and standardizing listed member characteristics parameters; and storing said list of population members. Pre-processing selectively replaces hierarchical parameters, chronological parameters and ranking parameters. The method may further comprise:

selecting a member as a target, one or more other members being previously identified as analogous members for said target; selecting member KPs as controlling KPs (CKPs). The population may comprise hydrocarbon reservoirs, population members being known hydrocarbon reservoirs, and said new population member being a new hydrocarbon reservoir.

Another embodiment is a reservoir valuation method comprising: configuring known reservoir data including an entry for each known reservoir and corresponding reservoir characteristics parameters; selecting controlling features from stored said reservoir characteristics parameters; storing configured said known reservoir data in a refined list of known reservoirs; receiving a description for a new reservoir, said description missing values for one or more reservoir characteristics parameters; automatically estimating a value for at least one missing value responsive to said stored list; supplementing the new reservoir description with each estimated value; automatically comparing the supplemented new reservoir description against each listed reservoir; and selecting a subset of listed reservoirs members as analogous reservoirs responsive to the comparison.

In this embodiment, configuring known reservoir data comprises: pre-processing raw known reservoir data; transforming, normalizing and standardizing listed known KPs; and storing said refined list of known reservoirs. Pre-processing selectively replaces hierarchical parameters, chronological parameters and ranking parameters. Selecting controlling features comprises: selecting a known reservoir as a target, one or more other known reservoirs being previously identified as analogous reservoirs for said target; selecting KPs as controlling KPs (CKPs). One or more said at least one KP missing a value is a CKP, and automatically estimating estimates values for CKPs, estimated values supplementing said description, missing new reservoir KPs not identified as CKPs being automatically estimated responsive to said selected subset. Automatically estimating CKP values determines an uncertainty for each estimated value, automatically comparing provides a cumulative uncertainty for said each identified analogous reservoirs responsive to determined uncertainties for estimated said key parameter values.

Another embodiment is a computer program product for comparing members of a population, said computer program product comprising a computer usable medium having computer readable program code stored thereon, said computer readable program code causing one or more computer executing said code to: store a list of population members and corresponding member characteristics parameters describing each listed member; receive a description for a new population member, said description missing one or more member characteristics parameters; automatically estimate a value for at least one missing member characteristic parameters responsive to stored said member characteristics parameters; supplement said description with each estimated value; automatically compare the supplemented description against stored descriptions for each listed member; and select a subset of listed members as analogous members for said new population member responsive to the comparison.

Yet another embodiment is a computer program product for valuating reservoirs, said computer program product comprising a computer usable medium having computer readable program code stored thereon, said computer readable program code causing a computer executing said code to: configure known reservoir data including an entry for each known reservoir and corresponding reservoir characteristics parameters; select controlling features from stored said reservoir characteristics parameters; store configured said known reservoir data in a refined list of known reservoirs; receive a description for a new reservoir, said description missing values for one or more reservoir characteristics parameters; automatically estimate a value for at least one missing value responsive to said stored list; supplement the new reservoir description with each estimated value; automatically compare the supplemented new reservoir description against each listed reservoir; and select a subset of listed reservoirs members as analogous reservoirs responsive to the comparison.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
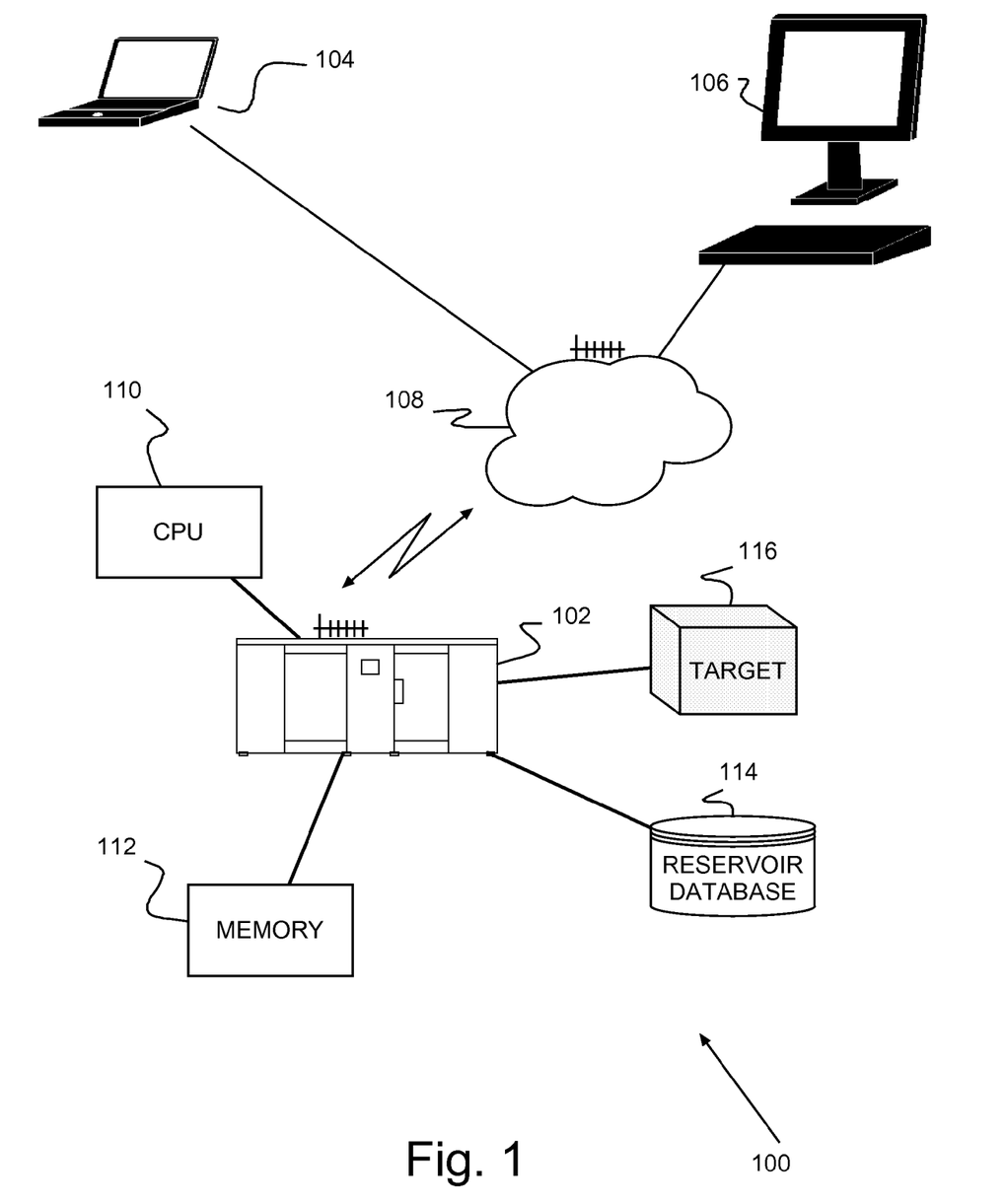
FIG. 1 shows an example of an appraisal system determining a qualified valuation for new population members (e.g., newly discovered hydrocarbon reservoirs) based on partial or incomplete descriptions of the new members, according to a preferred embodiment of the present invention.

Turning now to the drawings and more particularly, FIG. 1 shows an example of an appraisal system 100 determining analogous population members (e.g., known hydrocarbon reservoirs) and a qualified valuation for new members (e.g., newly discovered hydrocarbon reservoirs), based on partial or incomplete descriptions of the new members, according to a preferred embodiment of the present invention. In particular, the system 100 automatically supplies estimates of missing parameters of new members based on known characteristics for other existing members. The preferred system 100 uses the qualified supplemented descriptions to identify and select analogs. Using information from analogues, the system 100 also develops univariate probability distributions describing the uncertainty associated with each estimate. Resulting analogues are selected based on the joint distribution of member parameters, and are therefore, uncertain realizations of the new member within a determinate uncertainty.

Preferably, the appraisal system 100 includes one or more computers 102, 104, 106 (3 in this example) coupled, wired or wirelessly to, and communicating with each other over, a network 108. The network 108 may be, for example, a local area network (LAN), the Internet, an intranet or a combination thereof. Typically, the computers 102, 104, 106 include one or more processors, e.g., central processing unit (CPU) 110, memory 112 and local storage 114.

Local storage 114 includes a catalog or master database, e.g., a hydrocarbon reservoirs database, listing known or existing population members. Each list entry includes parameters describing characteristics for a respective member and previously identified analogous members for that member. Preferably, the system 100 trains in two phases, an offline or data preparation phase and an on-line or in-situ phase. Offline, the preferred system 100 refines raw member data, and in cooperation with an expert or experts, selects controlling features or parameters from the data for subsequent on-line use on new members.

There are more than a thousand currently known hydrocarbon reservoirs, for example, including carbonate and clastic reservoirs. Nearly two hundred (e.g., 182) shared characteristics or parameters may be used to describe reservoirs. Each member listed in the member database is described by values for associated parameters, where known. Since some values may be missing or unknown for each member, values for a subset of different parameters may be included for each known member or hydrocarbon reservoir. Of the nearly two hundred different hydrocarbon reservoir parameters, reservoir engineering experts consider a subset (30) as most important reservoir parameters. That subset have been selected/identified as key parameters (KPs). These more informative KPs are selected, e.g., by an expert, and designated within the system 100 as controlling (CKPs) for a specific assessed characteristic or use case.

On-line, one or more of the computers 102, 104, 106 may operate as a parameter extraction system, e.g., 102, automatically extracting missing parameter values for new members. Another computer may operate as an analogous member selection system, e.g., 104, automatically selecting existing members as analogous. Optionally, the same computer, e.g., 106, may operate as both the parameter extraction system and the analog selection system.

The preferred system 100 completes on-line preparation, using a similarity function and weights, e.g., supplied by an expert, to train the parameter extraction system 102 iteratively. The parameter extraction system 102 begins by generating a suitable (regression or classification) model using machine learning. The particular regression or classification model trains by estimating KP values from other parameters for each member. The trained system 100 automatically supplements descriptions of new members, e.g., newly discovered reservoirs, by automatically extracting or imputing missing values. Then, the system 100 automatically selects analogous existing members based on that supplemented description. The system 100 also automatically produces a univariate probability distribution for each parameter from the analogous members. Further, the distribution of the selected analogous members automatically combine with the univariate probability distributions characterizing uncertainty of the selection.

So, the preferred parameter extraction system 102 extracts estimates for parameters missing from the descriptions 116, based on corresponding characteristics for known members. The preferred parameter extraction system 102 supplements new member descriptions 116 with the estimates for a more complete description. As the supplemented descriptions are not exact, the estimates carry an uncertainty, albeit less uncertainty than the original description. When the preferred parameter extraction system 102 estimates a missing value, it also characterizes the respective uncertainty for subsequent consideration. The analogous member selection system, e.g., 104, uses the supplemented description and respective uncertainty to automatically select analogous members (reservoirs) from the known existing cataloged members. When the analogous member selection system 104 selects analogous reservoirs, the supplemented description carries the uncertainty into the analogous reservoir identification, e.g., for obtaining production potential and/or determining capture difficulty.

Thus, the preferred parameter extraction system 102 applies machine learning classifiers/regressors to new members, supplementing the new member description with imputed values for missing parameters and determine the uncertainty of estimating missing parameters. The preferred analogous member selection system 104 also selects analogous members from the supplemented description. From the selected analogous reservoirs, the system 100 estimates the new member's value accompanied by the corresponding uncertainty of the estimate, resulting in a qualified valuation for the new member or reservoir.

Specific hydrocarbon reservoir characteristics can include, for example, geological aspects, petro-physical parameters, reservoir properties, and development scheme. Geological aspects include, for example, geological age, lithology, depositional environments and the diagenetic and structural history. Petro-physical parameters include, for example, gross thickness, net-to-gross rations, pay thickness, porosity, hydrocarbon saturations, and permeability. Reservoir properties include, for example, depth, pressure, temperature, original fluid content, oil gravity, relative permeability, residual saturations and drive mechanisms. Development scheme includes, for example, well spacing, completion and stimulation, artificial lift, fluid injection, injection volumes. Parameters for these different characteristics may be further typed as numerical, categorical, hierarchical, ordinal and chronological.

Figure 2:
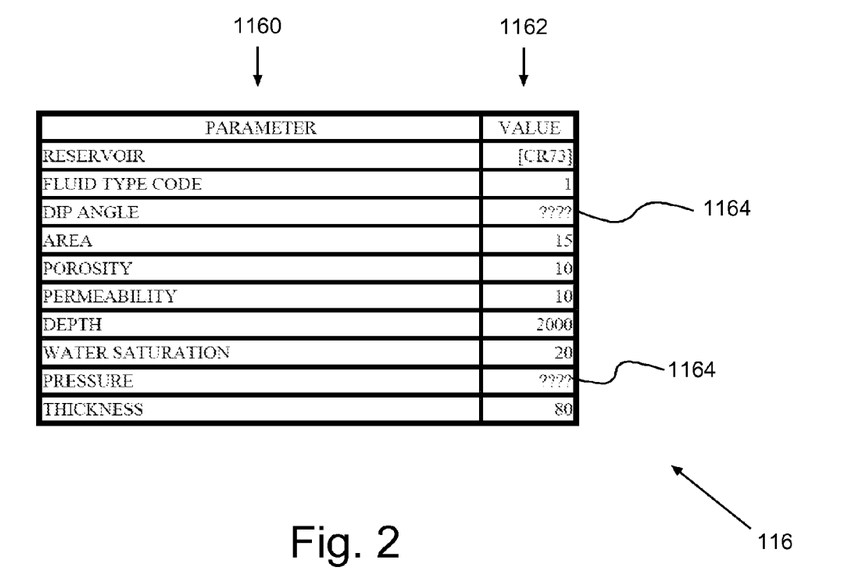
FIG. 2 shows an example of a new member description for a typical newly discovered hydrocarbon reservoir, listing characteristics and corresponding known values for each.

FIG. 2 shows an example of a new member description 116 for a typical newly discovered hydrocarbon reservoir, listing characteristics 1160 and corresponding known values 1162 for each. Some of the members have missing or unknown values 1164. Although values for all parameters may be potentially knowable, typically, a third of the values for parameters are unknown for one or more of those known hydrocarbon reservoirs. More specifically, nearly a third of the values are missing for more than half of the known reservoirs. Moreover, newly discovered reservoirs frequently have missing values for many more parameters, including key parameters. While for any reservoir, some known reservoirs are identifiably and quantifiably more similar than others, if some key parameters are missing, the closest matches may very well not be selected.

Thus, a preferred system 100 pre-configures a list of existing members, e.g., offline or pre-deployment, for subsequently extracting missing parameter values automatically based on what is known about new members. From this pre-configuration the preferred parameter extraction system 102 trains to estimate missing parameters on-line for any member from other known parameters for that member. Thereafter, new reservoirs are found and incomplete new member descriptions are added with missing parameter values. The preferred parameter extraction system 102 automatically supplements the incomplete description by extracting values from the refined data, based on known values in the new member description 116. Then, the preferred analogous member selection system 104 selects analogous members for the new member based on the supplemented description for subsequent consideration. The system 100 can use those selected analogous members for valuating the new member. Even though the result has an associated uncertainty, it has a higher level of confidence and a known uncertainty (univariate parameter distributions and analogous' parameter joint distribution), than would be achieved based on analogous members selected based on the original, incomplete description or on a description supplemented using a prior approach.

Figure 3A:
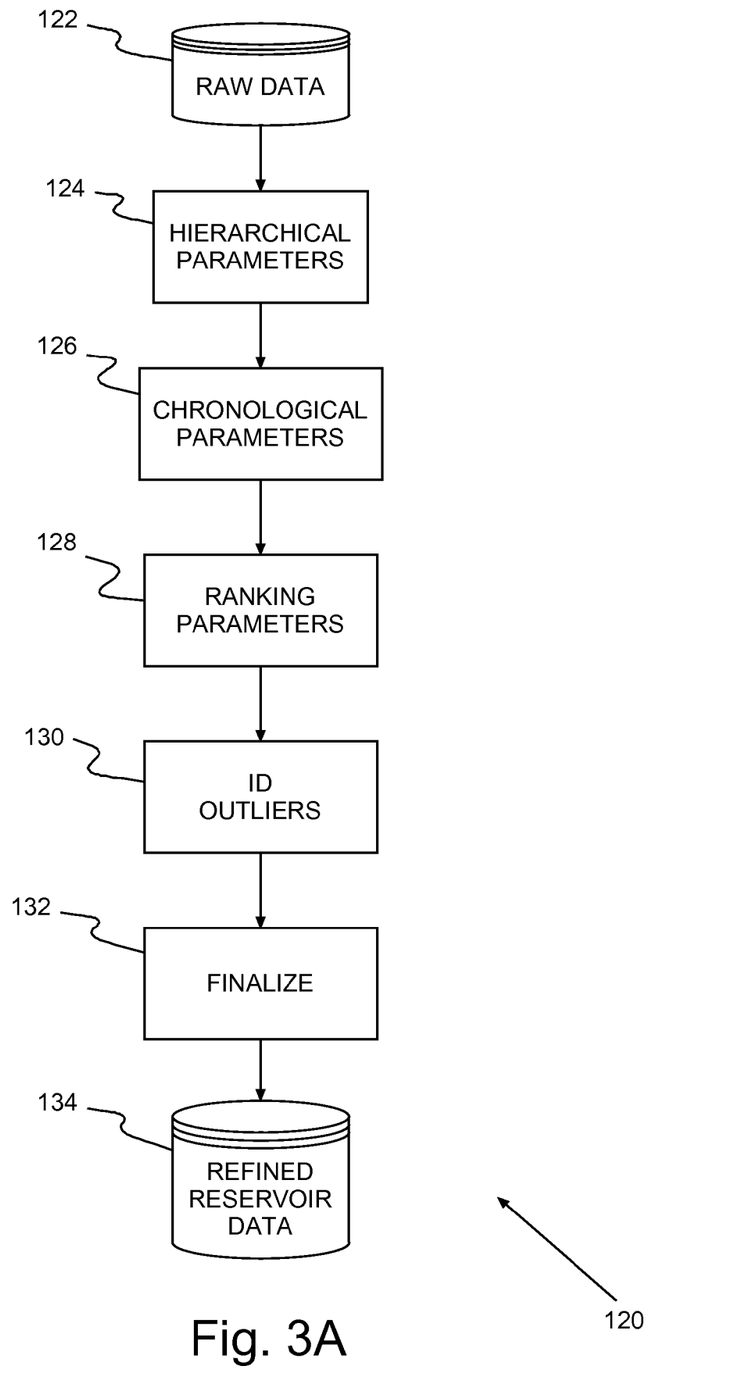
FIGS. 3A-B show an example of offline preparation, wherein training begins by pre-processing raw existing member data and concludes with selecting controlling features for subsequently, interactively evaluating new population members in situ.
Figure 3B:
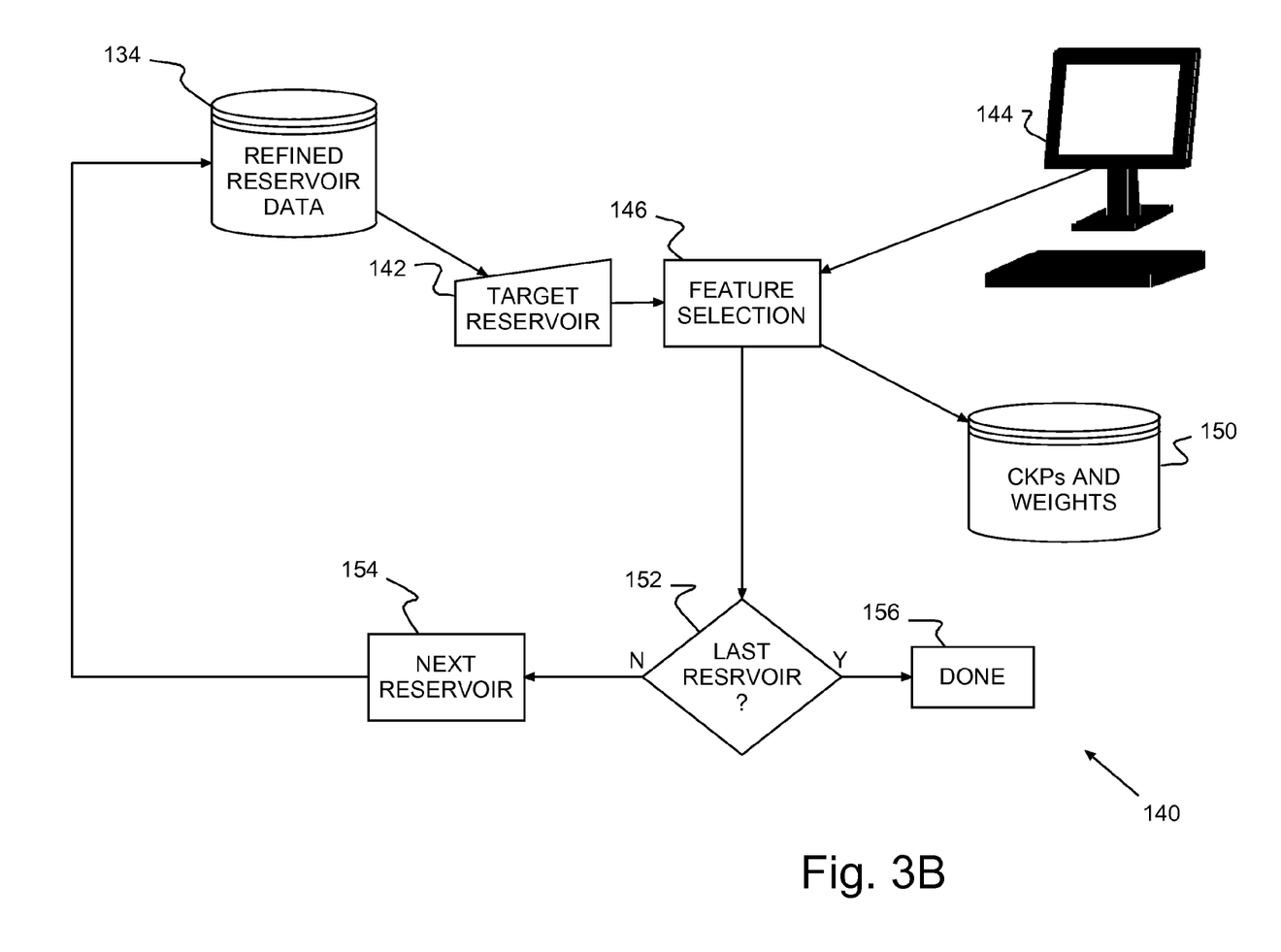

Offline preparation is shown in the example of FIGS. 3A-B, wherein training begins by pre-processing raw existing member data 120 and concludes with selecting controlling features 140 for subsequently evaluating new population members in situ. Primarily, a pre-processing unit prepares the existing data 120 to place it in a more suitable form for statistical methods. A feature selection unit interfaces with experts selecting controlling features 140, or CKPs that have high correlation to the use case target parameters to be predicted.

A master database 122, e.g., in storage 114 in FIG. 1, contains previously collected raw data on existing members (e.g., reservoirs) including known values for parameters characterizing member features. Pre-processing begins by treating hierarchical 124 and chronologic 126 and ranking 128 parameters in the raw data. Then, the system 102 identifies any outliers 130 in the results, e.g., interactively with the help of an expert or, automatically with the use of a statistical tool, and removes the identified outliers. Then, the system 102 finalizes 132 and consolidates the results in a refined database 134 with pre-configured member data, e.g., also in storage 114.

For the present hydrocarbon reservoir example, hierarchical parameters have deep levels that frequently are sparsely populated, containing just a few data points in the lower levels. So, to arrive at more reliable statistics, deeper levels are ignored by replacing 124 each hierarchical parameter with two new parameters. The first new parameter contains information of the first hierarchy level, and the second contains information from the first and the second levels. For example, a hierarchical parameter A with values 1.4.2.7, is replaced by parameters B with value 1 and C with value 1.4. Then, the most recent chronological parameter value is identified and substituted 126 in the raw data for each chronological parameter. Next, the most important value or the one with highest influence is identified and substituted 128 in the raw data for ranking type parameters.

Outlier identification 130 identifies and eliminates of outliers using, for example, SPSS Modeler/Statistics procedures from International Business Machines (IBM) Corporation. Finalization 132 involves, for example, data transformation, normalization and standardization. Preferably, the system 102 applies a suitable Box-Cox transformation to numeric values in the ranked data, and transforms the data to Gaussian distributions (which characterize uncertainty). Gaussian distributions are more appropriate for use in standard state of the art statistical analysis procedures.

FIG. 3B shows an iterative example of selecting controlling features 140 interactively. Each iteration begins by selecting one known member, a reservoir in this example, as a use case or target 142 from the current population members in the refined database 134. The refined database 134 provides reservoir parameter value(s) specified in given use cases, e.g. relative permeability. So, one or more experts 144 interactively identify and list controlling key parameters 146 on a case by case basis, iteration by iteration. After selecting and storing 150 key parameters, if unselected members remain 152 for selecting CKPs, one is selected 154 as a new use case target 142 in the next iteration and CKPs are selected 146. Once CKPs are selected for the last member 152, selection is complete 156.

Figure 4:
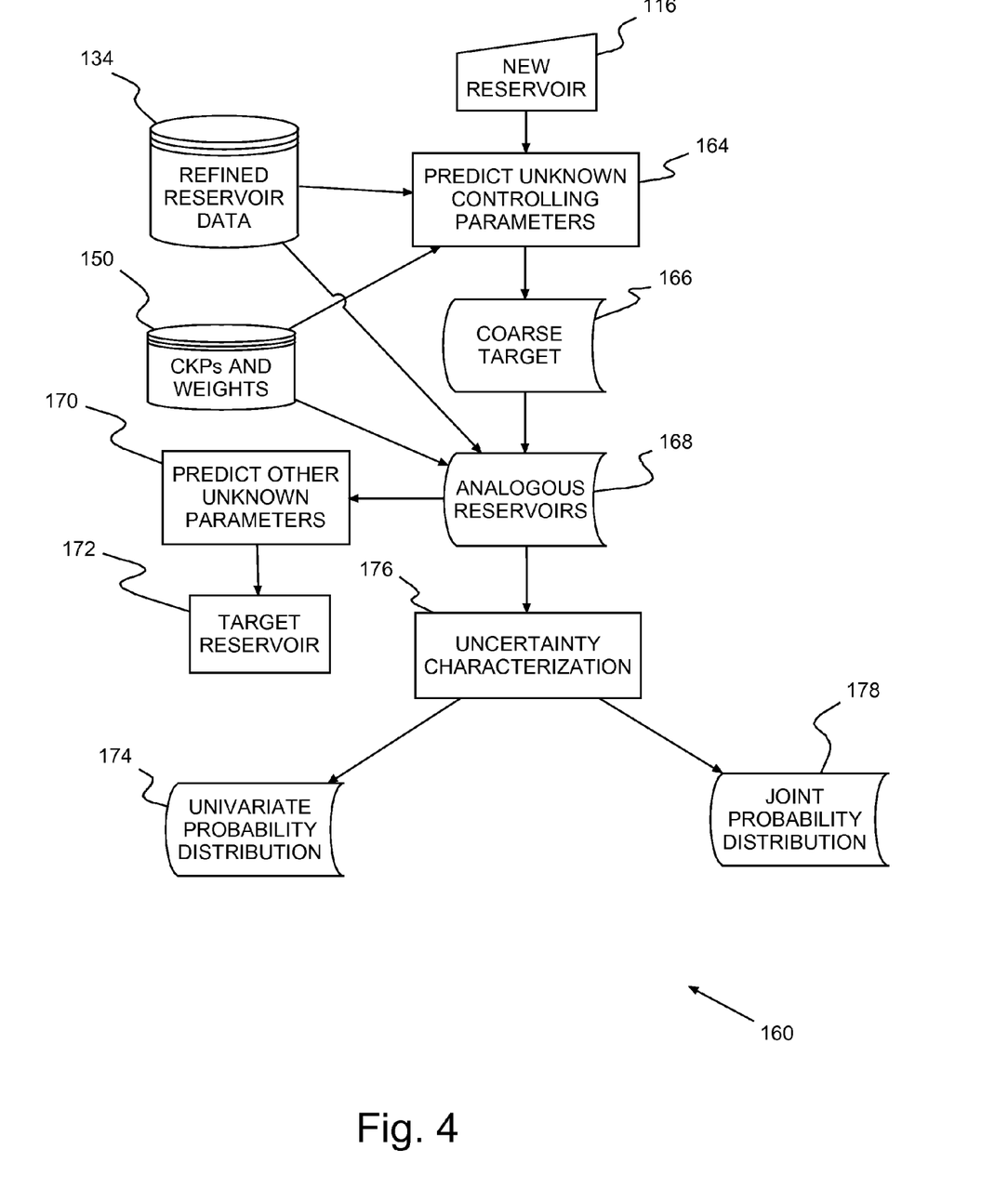
FIG. 4 shows an example of in situ valuation of a new member, e.g., a newly discovered reservoir.

FIG. 4 shows an example of in situ valuation 160 of a new member, e.g., a newly discovered reservoir, according to a preferred embodiment of the present invention. In particular the preferred system (e.g., 100 in FIG. 1), receives a description 116 of a new reservoir and parameter(s) specified in the given use case, e.g., relative permeability. The parameter extraction system 102 automatically supplies an approximation of unknown controlling parameters 164 to generate a modified description of the new reservoir or a coarse target 166. The system 100 uses the coarse target 166 to select analogous reservoirs 168. The parameter extraction system 102 uses the analogous reservoirs 168 as a basis for determining any other missing parameters 170, thereby providing a fuller description of the target reservoir 172. Coincidentally, the system 100 uses the analogous reservoirs 168 to determine a univariate distribution 174 for each parameter. These univariate distributions 174 and the joint probability distribution 176 characterize the uncertainty 178 on the estimated parameters.

Figure 5:
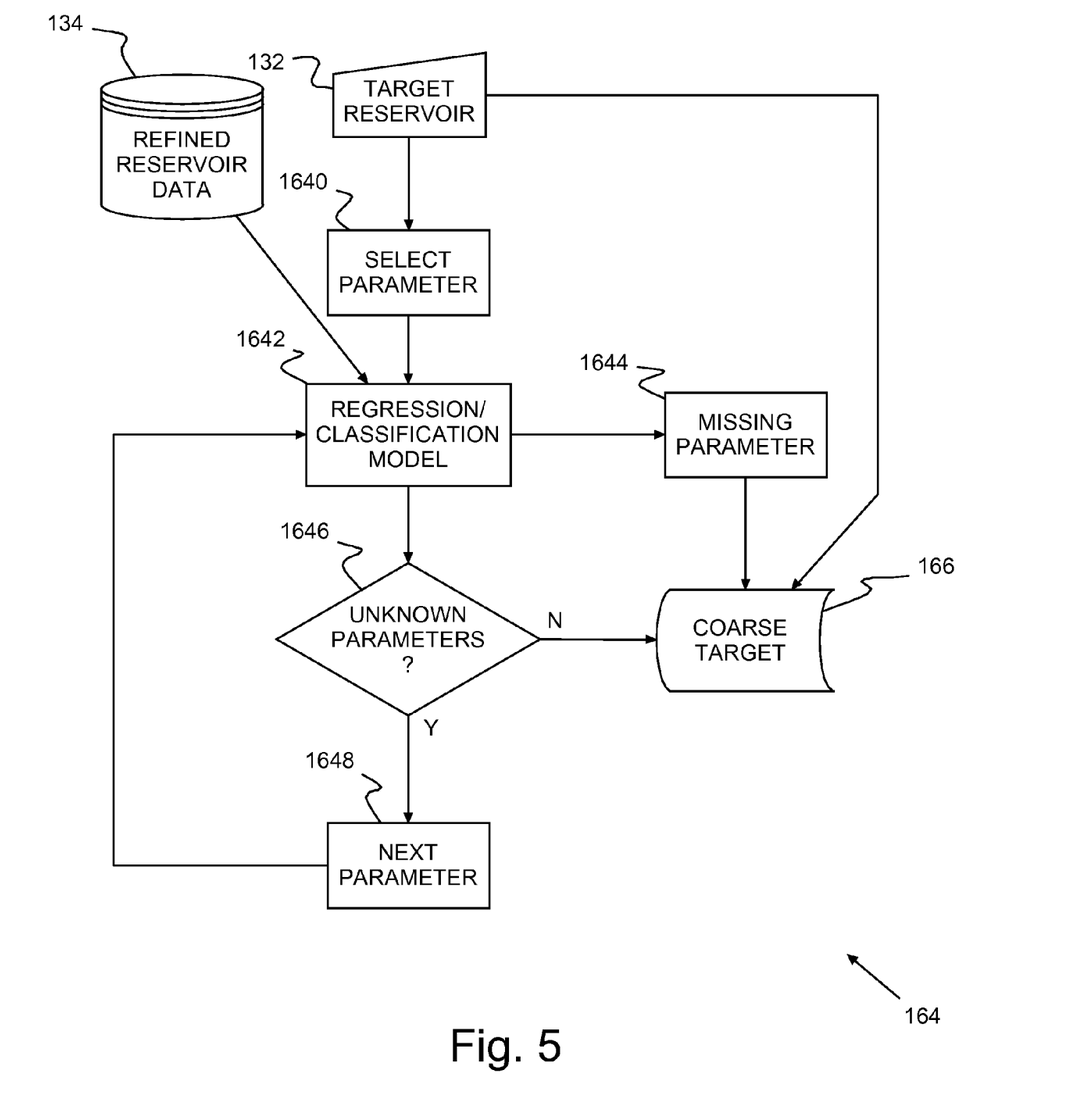
FIG. 5 shows an example of a parameter extraction system predicting unknown controlling parameters.

FIG. 5 shows an example of parameter extraction system 102 predicting unknown controlling parameters 164, iteratively, which begins by selecting 1640 an unknown controlling parameter for the target reservoir 116. Next, for each unknown controlling parameter of the new member data, using a suitable machine learning technique 1642 the extraction system 102 generates a regression model or a classification model from the refined reservoir data 134. The generated model contains references only to CKPs with known values in the new member data 116. Then, the generated model is applied to the new member data 116 to estimate 1644 missing CKP values. Once all unknown CKP values have been selected 1646 and, the new target has been supplemented 1648 with the estimates, a coarse target 166 has been generated for identifying and selecting analogous members 168.

Examples of machine learning techniques that generate suitable regression models 1642 for estimating numerical parameters 1644 (or for identifying analogous reservoirs 168) include linear regression, generalized linear models, neural networks, support vector regression, decision trees, and k-nearest neighbors models. Similarly, examples of machine learning techniques that generate suitable classification models for estimating categorical parameters 1644 include linear discriminant analysis, generalized linear, neural networks, support vector machines, decision trees, and k-nearest neighbors (k-nn) models. Only known parameters are model input variables.

Whenever the selected machine learning technique 1642 does not treat missing values, preferably, temporary missing values are imputed by default in the training data. Preferably also, each estimate is constrained to have an error below a selected acceptable error threshold. Some suitable machine learning prediction techniques generate a probability distribution output over the possible values. Otherwise, a probability distribution may be generated, providing a probability mass function when the parameter is nominal; or a probability density function (e.g. normal distribution) when the parameter is continuous. From the probability distribution the value with highest probability is selected as the estimated value 1644.

In selecting analogous members 168 the preferred selection system 104 provides and ranks members according to similarity value, most similar member to least similar member or reservoir. Unknown parameters are estimated 170 based only on the information from the selected analogous reservoirs 168. Preferably, other missing parameters are predicted 170 for the coarse target 166 from the selected analogous reservoirs 168 substantially identically to predicting unknown controlling parameters 164 and other member properties (static and dynamic parameters) using only on the information provided by the analogous members 168 or reservoirs.

Preferably also, the parameter extraction system 102 estimates the univariate distribution 174 for each initially unknown parameter and for any other target properties that may be of interest, solely based on information provided by the analogous reservoirs 168, e.g., from raw member data in a master database 120 or from member data in the refined database 134. These univariate distributions 176 together with the joint distribution 174 represented by the analogues, characterize the uncertainty 178 on the estimated parameters and discovered analogues. The parameter extraction system 102 may use resulting supplemented member (target reservoir 168) to estimate the value of the new reservoir 116.

Figure 6:
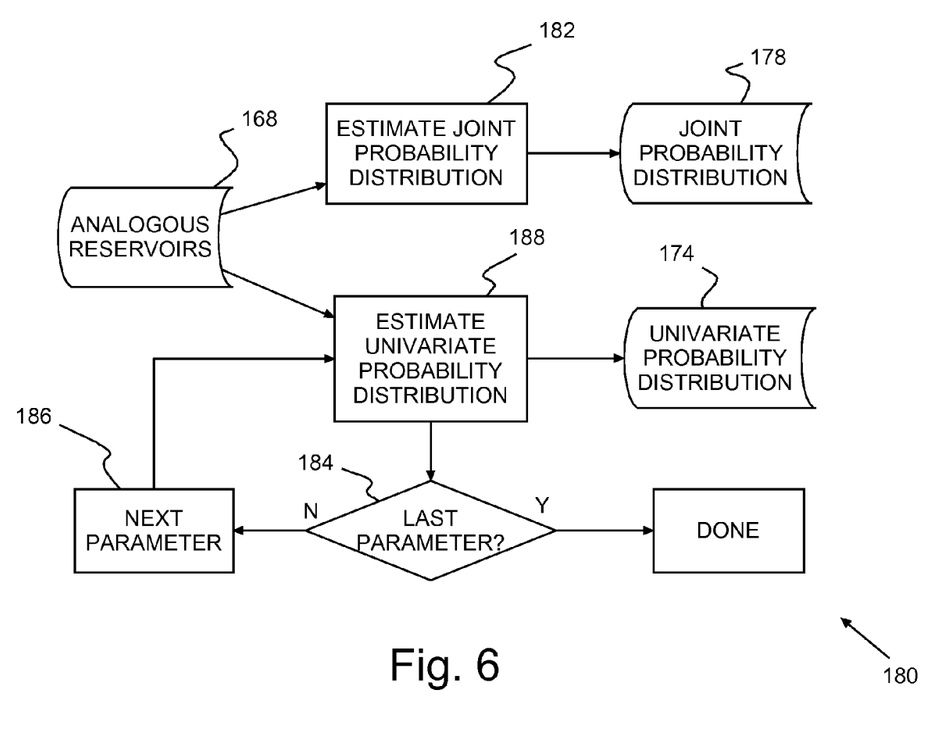
FIG. 6 shows an example of uncertainty characterization of a set of selected analogous members.

FIG. 6 shows an example of uncertainty characterization 180 of a set of selected analogous members 168. First, the joint parameter distribution 176 for the selected analogous members 168 is estimated 182. Then, iteratively 184 for each parameter 186, a univariate probability distribution 178 is estimated 184. In particular, the univariate probability distribution 178 can be estimated either by assuming a certain parametric distribution (e.g. normal distribution) and computing parameters using a maximum likelihood estimation; or by using a non-parametric method, e.g., Kernel Density Estimation.

Thus advantageously, the preferred valuation system identifies analogous members for each new member, even in the absence of a complete description for the new member. The description is supplemented with estimates for missing parameters for new members (e.g., hydrocarbon reservoirs). The supplemented description is used for selecting an optimum subset of known reservoirs as analogous reservoirs for valuating or appraising each newly discovered reservoir. By training value prediction on known member data, to predict values for missing parameter values, the preferred system supplements initially incomplete descriptions of the new reservoirs with estimates derived from cataloged characteristics of existing reservoirs. Thus, when applied to hydrocarbon reservoir valuation, analogous hydrocarbon reservoirs selection and subsequent valuation are not done blindly, based solely on incomplete data and descriptions. Instead, each valuation is based on likely values and accompanied by an indication of any uncertainty in arriving at that valuation.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A population comparison method comprising:
   storing a list of population members and corresponding member characteristics parameters describing each listed member, wherein the population members are hydrocarbon reservoirs;
   receiving a description for a new population member, said description missing one or more member characteristics parameters, wherein said at least one missing member characteristics parameters is a key parameter (KP);
   automatically estimating a value for at least one missing member characteristic parameters responsive to stored said member characteristics parameters;
   supplementing said description with each estimated value;
   automatically comparing the supplemented description against stored descriptions for each listed member;
   selecting a subset of listed members as analogous members for said new population member responsive to the comparison; and
   extracting an uncertainty characterization of said selected subset automatically responsive to selection.

2. A population comparison method as in claim 1, wherein a plurality of said KPs are identified as controlling KPs (CKPs), and one or more said at least one missing member characteristics parameters is a CKP.

3. A population comparison method as in claim 2, wherein automatically estimating comprises:
   generating a model from said list of population members references only to CKPs with known values in the new member data, missing said values for said KPs not identified as CKPs remaining unknown; and
   applying said generated model to said new member data to estimate missing CKP values for said new member.

4. A population comparison method as in claim 3, wherein extracting said uncertainty characterization comprises:
   extracting a univariate probability distribution for each parameter from analogous members data; and
   extracting a joint probability distribution of analogous members parameters.

5. A population comparison method as in claim 4, before storing said list, said method further comprising pre-configuring said list, pre-configuring comprising:
   pre-processing said raw member data, said raw member data including an entry for said each listed member, each said entry including said corresponding member characteristics parameters;
   eliminating outlier members;
   transforming, normalizing and standardizing listed member characteristics parameters; and
   storing said list of population members.

6. A population comparison method as in claim 5, wherein pre-processing selectively replaces hierarchical parameters, chronological parameters and ranking parameters, and after transforming, normalizing and standardizing, said method further comprises:
   selecting a member as a target, one or more other members being previously identified as analogous members for said target; and
   selecting member KPs as controlling KPs (CKPs).

7. A population comparison method as in claim 3, wherein said model is a regression model.

8. A population comparison method as in claim 3, wherein said model is a classification model.

9. A population comparison method as in claim 1, wherein said population comprises hydrocarbon reservoirs, population members being known hydrocarbon reservoirs, and said new population member being a new hydrocarbon reservoir, said method further comprising automatically estimating further comprises estimating values for remaining unknown KPs responsive to said selected subset.

10. A reservoir valuation method comprising:
    configuring known reservoir data including an entry for each known reservoir and corresponding reservoir characteristics parameters;
    selecting controlling features from stored said reservoir key parameters (KPs);
    storing the configured said known reservoir data in a refined list of known reservoirs;
    receiving a description for a new reservoir, said description missing values for one or more KPs;
    automatically estimating a value for at least one missing value responsive to said stored refined list;
    supplementing the new reservoir description with each estimated value;
    automatically comparing the supplemented new reservoir description against each listed reservoir;
    selecting a subset of listed reservoirs members as analogous reservoirs responsive to the comparison; and
    extracting an uncertainty characterization of said selected subset automatically responsive to selection.

11. A reservoir valuation method as in claim 10, wherein configuring known reservoir data comprises:
    selectively replaces hierarchical parameters, chronological parameters and ranking parameters;
    selecting a known reservoir as a target, one or more other known reservoirs being previously identified as analogous reservoirs for said target; and
    selecting KPs as controlling KPs (CKPs) eliminating outlier known reservoirs;
    transforming, normalizing and standardizing listed known KPs; and
    storing said refined list of known reservoirs.

12. A reservoir valuation method as in claim 10, wherein one or more said at least one KP missing a value is a CKP, and automatically estimating comprises:
    generating a model from said list of population members references only to CKPs with known values in the new member data, missing said values for said KPs not identified as CKPs remaining unknown; and
    applying said generated model to said new member data to estimate missing CKP values for said new member, estimated values supplementing said description, missing new reservoir KPs not identified as CKPs being automatically estimated responsive to said selected subset.

13. A reservoir valuation method as in claim 12, wherein said model is a regression model and extracting said uncertainty characterization comprises:
    extracting a univariate probability distribution for each parameter from analogous members data; and
    extracting a joint probability distribution of analogous members parameters.

14. A reservoir valuation method as in claim 12, wherein said model is a classification model and extracting said uncertainty characterization comprises:
    extracting a univariate probability distribution for each parameter from analogous members data; and extracting a joint probability distribution of analogous members parameters.

15. A computer program product for comparing members of a population, said computer program product comprising a computer usable medium having computer readable program code stored thereon, said computer readable program code causing one or more computer executing said code to:
  store a list of population members and corresponding member characteristics parameters describing each listed member;
  receive a description for a new population member, said description missing one or more member characteristics parameters;
  automatically estimate a value for at least one missing member characteristic parameters responsive to stored said member characteristics parameters;
  supplement said description with each estimated value;
  automatically compare the supplemented description against stored descriptions for each listed member;
  select a subset of listed members as analogous members for said new population member responsive to the comparison; and
  extract an uncertainty characterization of said selected subset automatically responsive to selection.

16. A computer program product for comparing members of a population as in claim 15, wherein a plurality of said member characteristic parameters are key parameters (KPs), a plurality of said KPs are identified as controlling KPs (CKPs), and one or more said at least one missing member characteristics parameters is a CKP.

17. A computer program product for comparing members of a population as in claim 15, wherein causing said one or more computer executing said code to automatically estimate said value causes said one or more computer to:
  generate a model from said list of population members references only to CKPs with known values in the new member data, missing said values for said KPs not identified as CKPs remaining unknown; and
  apply said generated model to said new member data to estimate missing CKP values for said new member.

18. A computer program product for comparing members of a population as in claim 17, wherein causing said one or more computer executing said code to extract said uncertainty characterization causes said one or more computer to:
  extract a univariate probability distribution for each parameter from analogous members data; and
  extract a joint probability distribution of analogous members parameters.

19. A computer program product for comparing members of a population as in claim 18, wherein said population comprises hydrocarbon reservoirs, population members being known hydrocarbon reservoirs, and said new population member being a new hydrocarbon reservoir before storing said list, said computer readable program code further causing said one or more computer executing said code to:
  pre-process raw known reservoirs data, said raw known reservoirs data including an entry for said each listed reservoir, each said entry including said corresponding reservoir characteristics parameters;
  eliminate outlier reservoirs;
  transform, normalize and standardize listed reservoir characteristics parameters;
  and storing said list of known reservoirs.

20. A computer program product for comparing members of a population as in claim 18, wherein pre-processing selectively replaces hierarchical parameters, chronological parameters and ranking parameters, and after transforming, normalizing and standardizing, said one or more computer further being caused to:
  receive selection of a known reservoir as a target, one or more other known reservoirs being previously identified as analogous reservoirs for said target;
  receive selection of KPs as a CKPs;
  receive weights weighting said KPs in a similarity function to compare said target to other known reservoirs, and interactively adjust the weights and similarity function to select said previously identified analogous reservoirs;
  return to receive selection of another known reservoir as a target until all known reservoirs have been selected; and
  store said weights and similarity function, said similarity function being applied to said description, said weights being applied to said new member CKPs to estimate missing new reservoir CKPs.

21. A computer program product for valuating reservoirs, said computer program product comprising a non-transitory computer usable medium having computer readable program code stored thereon, said computer readable program code causing a computer executing said code to:
  configure known reservoir data including an entry for each known reservoir and corresponding reservoir key parameters (KPs);
  select controlling features from stored said KPs to identify controlling KPs (CKPs);
  store configured said known reservoir data in a refined list of known reservoirs;
  receive a description for a new reservoir, said description missing values for one or more said KPs;
  automatically estimate a value for at least one missing value responsive to said stored refined list;
  supplement the new reservoir description with each estimated value;
  automatically compare the supplemented new reservoir description against each listed reservoir;
  select a subset of listed reservoirs members as analogous reservoirs responsive to the comparison; and
  extract an uncertainty characterization of said selected subset automatically responsive to selection.

22. A computer program product for comparing members of a population as in claim 21, wherein:
  causing said one or more computer executing said code to configure known reservoir data causes said one or more computer to:
  pre-process raw known reservoir data, eliminate outlier known reservoirs, transform, normalize and standardize KPs for listed known reservoirs, and
  store said list of known reservoirs; and
  causing said one or more computer executing said code to select controlling features causes said one or more computer to:
  receive selection of a known reservoir as a target, one or more other known reservoirs being previously identified as analogous reservoirs for said target, receive selection of KPs as a CKPs, receive weights weighting said KPs in a similarity function to compare said target to other known reservoirs, the weights and similarity function being adjusted to select said previously identified analogous reservoirs, return to receive selection of another known reservoir as a target until all known reservoirs have been selected; and
  store said weights and similarity function, said similarity function being applied to said description, said weights being applied to said new reservoir characteristics parameters to estimate missing new reservoir CKP values.

23. A computer program product for comparing members of a population as in claim 22, wherein pre-processing selectively replaces hierarchical parameters, chronological parameters and ranking parameters, one or more said at least one missing new reservoir characteristics parameters is a key parameter, and causing said one or more computer executing said code to automatically estimate causes said one or more computer to generate a model from said list of population members references only to CKPs with known values in the new member data; and apply said generated model to said new member data to estimate missing CKP values for said new member, missing new reservoir KP values not identified as CKPs being automatically estimated responsive to said selected subset.

24. A computer program product for comparing members of a population as in claim 23, wherein causing said one or more computer executing said code to extract an uncertainty characterization causes said one or more computer to extract a univariate probability distribution for each parameter from analogous members data; and extract a joint probability distribution of analogous members parameters.

* * * * *